US012602061B2

(12) United States Patent
Lee et al.

(10) Patent No.: US 12,602,061 B2
(45) Date of Patent: Apr. 14, 2026

(54) UNMANNED AERIAL VEHICLE INSPECTION ROUTE GENERATING APPARATUS AND METHOD

(71) Applicant: DELTA ELECTRONICS, INC., Taoyuan City (TW)

(72) Inventors: Kual-Zheng Lee, Taoyuan City (TW); Tzu-Yang Lin, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 249 days.

(21) Appl. No.: 18/490,776

(22) Filed: Oct. 20, 2023

(65) Prior Publication Data

US 2024/0361775 A1 Oct. 31, 2024

(30) Foreign Application Priority Data

Apr. 28, 2023 (CN) .......................... 202310484467.7

(51) Int. Cl.
*G05D 1/644* (2024.01)
*G05D 1/229* (2024.01)
(Continued)

(52) U.S. Cl.
CPC ........... *G05D 1/644* (2024.01); *G05D 1/2297* (2024.01); *G05D 2105/89* (2024.01); *G05D 2109/20* (2024.01)

(58) Field of Classification Search
CPC .. G05D 1/0027; G05D 1/0055; G05D 1/0066; G05D 1/0202; G05D 1/101;
(Continued)

(56) References Cited

U.S. PATENT DOCUMENTS 9,671,790 B2 6/2017 Srivastava et al.
9,678,507 B1 * 6/2017 Douglas ................... G08G 5/22
(Continued)

FOREIGN PATENT DOCUMENTS

CN 111045101 A 4/2020
CN 111652964 A 9/2020
(Continued)

OTHER PUBLICATIONS

Bono et al., "Path planning and control of a UAV fleet in bridge management systems," Remote Sensing, 2022, 14 (8) 1858. 17 pages (Year: 2022).*
(Continued)

*Primary Examiner* — Spencer D Patton
(74) *Attorney, Agent, or Firm* — CKC & Partners Co., LLC

(57) ABSTRACT

An unmanned aerial vehicle inspection route generating apparatus and method are provided. The apparatus generates a plurality of inspection points corresponding to a target object to be inspected, and each of the inspection points corresponds to a spatial coordinate. The apparatus calculates a plurality of flight segments based on a three-dimensional model corresponding to the target object to be inspected and the spatial coordinates corresponding to the inspection points, and each of the flight segments corresponds to two of the inspection points. The apparatus calculates a risk value corresponding to each of the flight segments. The apparatus generates an inspection route corresponding to the target object to be inspected based on the risk values and the flight segments.

16 Claims, 3 Drawing Sheets

(51) Int. Cl.
G05D 105/80 (2024.01)
G05D 109/20 (2024.01)

(58) Field of Classification Search
CPC ...... G05D 1/104; G05D 1/106; G05D 1/1064;
G05D 1/229–2297; G05D 1/246–2465;
G05D 1/46; G05D 1/467; G05D 1/617;
G05D 1/619; G05D 1/622–637; G05D
1/644; G05D 1/6445; G05D 1/646; G05D
1/689; G05D 1/69–693; G05D
2109/20–254; G05D 2105/80–93; G08G
5/30–34
See application file for complete search history.

(56) References Cited

U.S. PATENT DOCUMENTS

| | | |
|---|---|---|
| 10,061,470 B2 | 8/2018 | Richman et al. |
| 10,083,616 B2 | 9/2018 | Bauer et al. |
| 2017/0259912 A1 | 9/2017 | Michini et al. |
| 2019/0054937 A1 | 2/2019 | Graetz et al. |
| 2020/0105149 A1 | 4/2020 | Mahkonen et al. |
| 2020/0174478 A1 | 6/2020 | Abdellatif et al. |
| 2020/0377233 A1 | 12/2020 | Harvey et al. |
| 2021/0181722 A1 | 6/2021 | Tan et al. |
| 2022/0005361 A1 | 1/2022 | de la Cruz et al. |
| 2022/0269290 A1* | 8/2022 | Dadkhah Tehrani .... G05D 1/81 |
| 2022/0350333 A1* | 11/2022 | Huang ................. G05D 1/0212 |
| 2023/0061934 A1 | 3/2023 | Stein |
| 2023/0064115 A1 | 3/2023 | Elkins |
| 2023/0106432 A1 | 4/2023 | Baumgartner et al. |

FOREIGN PATENT DOCUMENTS

| | | | | |
|---|---|---|---|---|
| CN | 112258491 A | | 1/2021 | |
| CN | 112578817 A | | 3/2021 | |
| CN | 113111714 A | | 7/2021 | |
| CN | 114138018 A | * | 3/2022 | ............ G05D 1/101 |
| CN | 114207545 A | | 3/2022 | |
| CN | 114578842 A | | 6/2022 | |
| CN | 115032996 A | | 9/2022 | |
| CN | 115892451 A | | 4/2023 | |
| TW | 202217359 A | | 5/2022 | |
| WO | 2022053569 A1 | | 3/2022 | |

OTHER PUBLICATIONS

H. Shakhatreh et al., "Unmanned aerial vehicles (UAVs): a survey on civil applications and key research challenges," in IEEE Access, vol. 7, pp. 48572-48634, 2019.

R. K. Balagopalan, "Simulation based cost-benefit analysis for the inspection of highway bridges using small unmanned aerial systems," A thesis submitted to the College of Engineering at Florida Institute of Technology, May 2018.

E. Capello et al., "A waypoint-based guidance algorithm for mini UAVs," 2nd IFAC Workshop on Research, Education and Development of Unmanned Aerial Systems, Nov. 20-22, 2013.

M. Bastourous, "Optimized UAV waypoints selection for maximum area coverage," A thesis submitted for the Degree of MSc in Computer Vision (MSCV) of Universite Bourgogne Franche-Comte, Jun. 2016.

H. Liu et al., "An autonomous path planning method for unmanned aerial vehicle based on a tangent intersection and target guidance strategy," in IEEE Transactions on Intelligent Transportation Systems, vol. 23, No. 4, pp. 3061-3073, Apr. 2022.

D. Nar et al., "Optimal waypoint assignment for designing drone light show formations," Results in Control and Optimization, vol. 9, 2022, 100174.

A. Bono et al., "Path planning and control of a UAV fleet in bridge management systems," Remote Sensing, 2022, 14(8), 1858, 17 pages.

Qin, R et al., "UAV project—building a reality-based 3D model of the NUS (National University of Singapore) campus," in Proc. ACRS2012, 2012, 9 pages.

Zhou et al., "Survey on path and view planning for UAVs," Virtual Reality & Intelligent Hardware, 2020, vol. 2, No. 1, pp. 56-69.

A. Madkour et al., "A survey of shortest-path algorithms," arXiv:1705.02044, May 8, 2017.

D. Das et al., "A simple algorithm for multiple-source shortest paths in planar digraphs," in Proceedings Symposium on Simplicity in Algorithms, 2022, pp. 1-11.

* cited by examiner

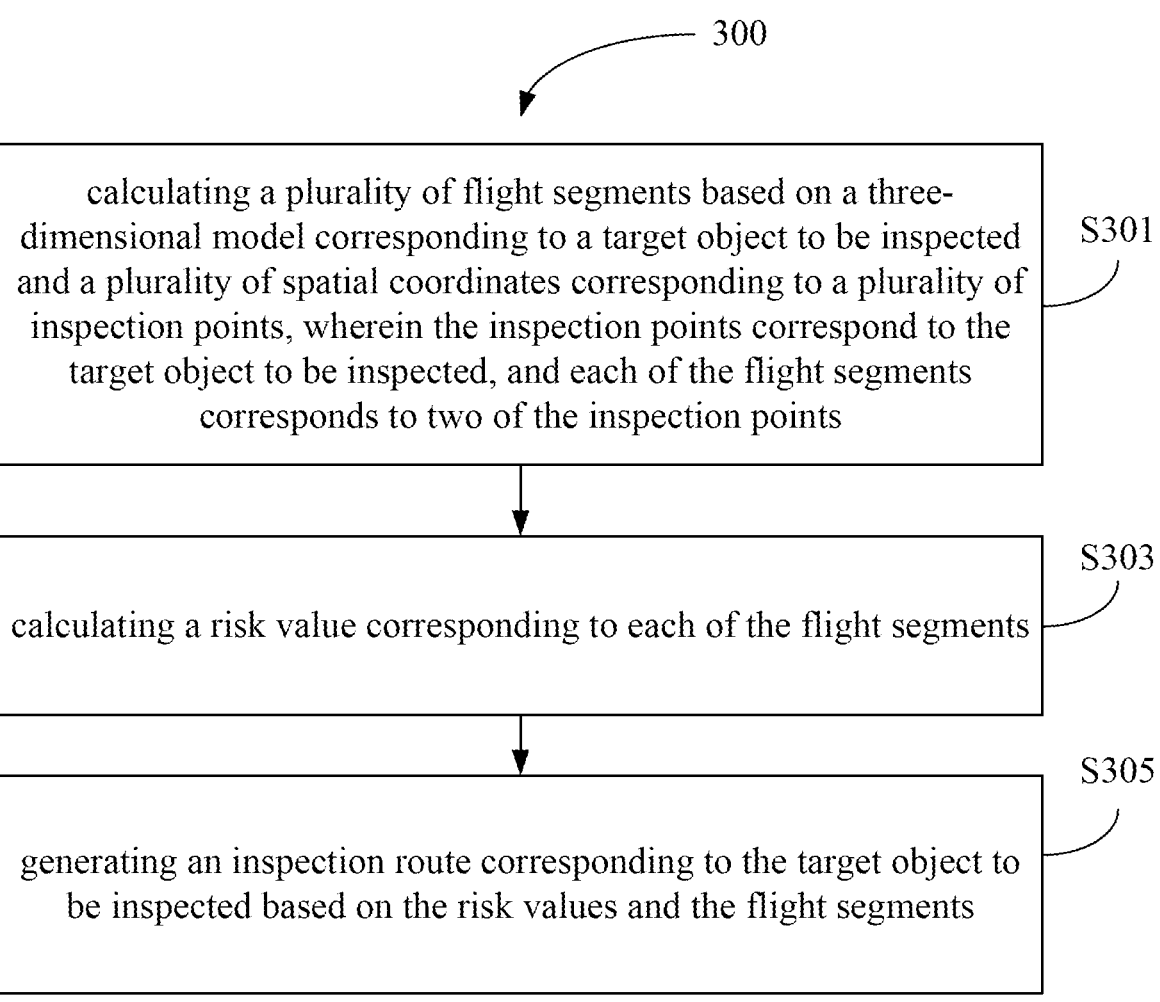

— 300 calculating a plurality of flight segments based on a three-dimensional model corresponding to a target object to be inspected and a plurality of spatial coordinates corresponding to a plurality of inspection points, wherein the inspection points correspond to the target object to be inspected, and each of the flight segments corresponds to two of the inspection points

S301 calculating a risk value corresponding to each of the flight segments

S303 generating an inspection route corresponding to the target object to be inspected based on the risk values and the flight segments

UNMANNED AERIAL VEHICLE INSPECTION ROUTE GENERATING APPARATUS AND METHOD

CROSS-REFERENCE TO RELATED APPLICATION

This application claims priority to China Application Serial Number 202310484467.7, filed Apr. 28, 2023, which is herein incorporated by reference in its entirety.

BACKGROUND

Field of Invention

The present invention relates to an unmanned aerial vehicle inspection route generating apparatus and method. More particularly, the present invention relates to an unmanned aerial vehicle inspection route generating apparatus and method capable of generating an inspection route corresponding to a target to be inspected.

Description of Related Art

Recently, with the rapid development of Unmanned Aerial Vehicle (UAV) technology, a large number of applications related to UAV have been proposed one after another.

In addition, due to the cost and speed advantages of the unmanned aerial vehicle, the task of inspecting objects through unmanned aerial vehicles (e.g., the safety inspection of the bridge structure) is one of the most important applications.

However, in the prior art, it is generally necessary for the user to pre-determine and set the number of unmanned aerial vehicles participating in the inspection task, and the user needs to pre-plan the inspection route of the unmanned aerial vehicle (e.g., mark a graphic mark to guide the flight of the unmanned aerial vehicle), so the inspection route cannot be efficiently generated.

Furthermore, since the target objects to be inspected have different scales, and the device capability of the unmanned aerial vehicle is limited (e.g., limited by the flight distance of the battery), the inspection route planned by the user may not be able to complete the inspection task safely and efficiently.

Accordingly, there is an urgent need for an unmanned aerial vehicle inspection route generating technology that can generate an inspection route corresponding to a target to be inspected.

SUMMARY

An objective of the present disclosure is to provide an unmanned aerial vehicle inspection route generating apparatus. The unmanned aerial vehicle inspection route generating apparatus comprises a storage and a processor. The processor is electrically connected to the storage. The storage is configured to store a three-dimensional model corresponding to a target object to be inspected. The processor generates a plurality of inspection points corresponding to the target object to be inspected, and each of the inspection points corresponds to a spatial coordinate. The processor calculates a plurality of flight segments based on the three-dimensional model and the spatial coordinates corresponding to the inspection points, and each of the flight segments corresponds to two of the inspection points. The processor calculates a risk value corresponding to each of the flight segments. The processor generates an inspection route corresponding to the target object to be inspected based on the risk values and the flight segments.

Another objective of the present disclosure is to provide an unmanned aerial vehicle inspection route generating method, which is adapted for use in an electronic apparatus. The unmanned aerial vehicle inspection route generating method comprises the following steps: calculating a plurality of flight segments based on a three-dimensional model corresponding to a target object to be inspected and a plurality of spatial coordinates corresponding to a plurality of inspection points, the inspection points correspond to the target object to be inspected, and each of the flight segments corresponds to two of the inspection points; calculating a risk value corresponding to each of the flight segments; and generating an inspection route corresponding to the target object to be inspected based on the risk values and the flight segments.

According to the above descriptions, the unmanned aerial vehicle inspection route generating technology (at least including the apparatus and the method) provided by the present disclosure calculates a plurality of flight segments and corresponding risk values by a three-dimensional model corresponding to a target object to be inspected and a plurality of spatial coordinates corresponding to a plurality of inspection points. Next, the unmanned aerial vehicle inspection route generating technology provided by the present disclosure generates an inspection route corresponding to the target object to be inspected based on the risk values and the flight segments. In addition, the unmanned aerial vehicle inspection route generating technology provided by the present disclosure can further adjust the unmanned aerial vehicle quantity of the inspection path based on a flight distance threshold of a single aerial vehicle, and generate the at least one inspection sub-route based on the unmanned aerial vehicle quantity. Since the unmanned aerial vehicle inspection route generating technology can automatically generate the inspection route corresponding to the target to be inspected, it solves the various shortcomings of the prior art that requires manual planning.

The detailed technology and preferred embodiments implemented for the subject disclosure are described in the following paragraphs accompanying the appended drawings for people skilled in this field to well appreciate the features of the claimed disclosure.

BRIEF DESCRIPTION OF THE DRAWINGS

FIG. 3 is a partial flowchart depicting an unmanned aerial vehicle inspection route generating method of the second embodiment.

DETAILED DESCRIPTION

In the following description, an unmanned aerial vehicle inspection route generating apparatus and method according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
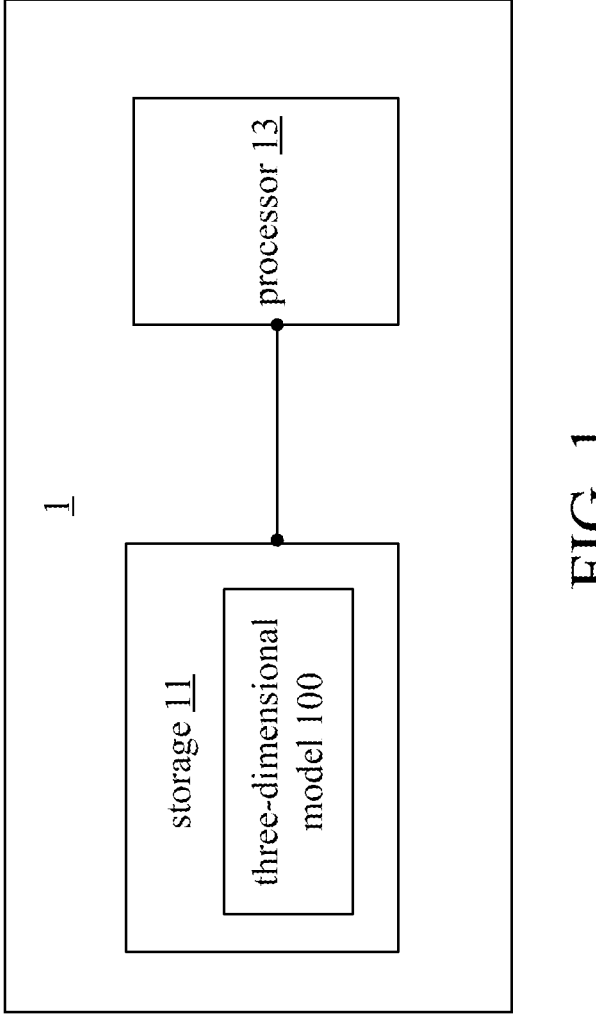
FIG. 1 is a schematic view depicting the structure of an unmanned aerial vehicle inspection route generating apparatus of the first embodiment.

The first embodiment of the present disclosure is an unmanned aerial vehicle inspection route generating apparatus 1, and a schematic diagram is depicted in FIG. 1. The unmanned aerial vehicle inspection route generating apparatus 1 comprises the storage 11 and the processor 13. The processor 13 is electrically connected to the storage 11. The storage 11 may be a memory, a Universal Serial Bus (USB) disk, a hard disk, a Compact Disk (CD), a mobile disk, or any other storage medium or circuit known to those of ordinary skill in the art and having the same functionality. The processor 13 may be any of various processors, Central Processing Units (CPUs), microprocessors, digital signal processors or other computing apparatuses known to those of ordinary skill in the art.

It shall be appreciated that in the application environment of the present disclosure, the purpose is to inspect an object to be inspected (e.g., a bridge) by unmanned aerial vehicles (singular or plural) equipped with a camera. In the present disclosure, the inspection route corresponding to the object to be inspected can be generated by the unmanned aerial vehicle inspection route generating apparatus 1.

In the present embodiment, as shown in FIG. 1, the storage 11 is configured to store a three-dimensional model 100 corresponding to an object to be inspected.

It shall be appreciated that the three-dimensional model may at least comprise the size of the scene, a plurality of node coordinates corresponding to the model, a plurality of node information comprised in a mesh plane, and the like.

For example, the processor 13 can use the unmanned aerial vehicle to take images of the target to be inspected and use an application program (e.g., Pix4D) to construct the three-dimensional model 100 corresponding to the target to be inspected.

In some embodiments, the processor 13 may also design the three-dimensional model 100 corresponding to the object to be inspected through a splicing operation algorithm or a 3D drawing software (e.g., SketchUp).

In some embodiment, the processor 13 generates a plurality of inspection points corresponding to the target object to be inspected, and each of the inspection points corresponds to a spatial coordinate.

It shall be appreciated that the inspection points in the present disclosure are the positions where the target object to be inspected needs to be inspected. Taking the example of bridge inspection as an example, these inspection points are important positions for inspecting the safety structure of bridges (i.e., the unmanned aerial vehicle is required to take images corresponding to the target object to be inspected from the inspection points).

In some embodiments, the inspection points corresponding to the target object to be inspected can be generated by the processor 13 based on a plurality of inspection rules (e.g., inspection points need to be set every 5 meters), or preset by professionals.

It shall be appreciated that the inspection points in the present disclosure can also be called waypoints, which can comprise information such as longitude, latitude, altitude, unmanned aerial vehicle heading or camera angle (i.e., the angle at which the unmanned aerial vehicle takes pictures at the waypoint).

In the present embodiment, the processor 13 calculates a plurality of flight segments based on the three-dimensional model 100 and the spatial coordinates corresponding to the inspection points, and each of the flight segments corresponds to two of the inspection points.

It shall be appreciated that the flight segment in the present disclosure is composed of any two inspection points (i.e., the non-collision path passed by the unmanned aerial vehicle from the previous inspection point to the next inspection point).

Specifically, the processor 13 performs the following operations for any of a first inspection point and a second inspection point among the inspection points: the processor 13 calculates at least one non-collision path between the first inspection point and the second inspection point based on a plurality of nodes contained in the three-dimensional model 100 (e.g., the edge position of the object to be inspected), the spatial coordinate corresponding to the first inspection point, and the spatial coordinate corresponding to the second inspection point, and each of the at least one non-collision path does not collide with the nodes of the three-dimensional model 100. Next, the processor 13 selects a shortest path from the at least one non-collision path as the flight segment corresponding to the first inspection point and the second inspection point.

Figure 2:
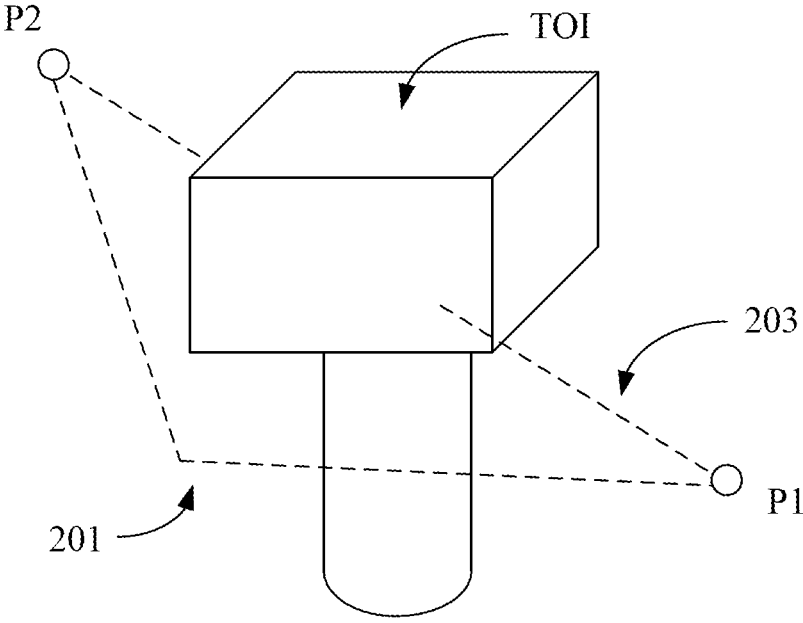
FIG. 2 is a schematic view depicting the inspection path of the first embodiment.

For ease of understanding, please refer to FIG. 2, which illustrates a schematic diagram of an inspection path. In FIG. 2, the object to be inspected TOI corresponds to the inspection point P1 and the inspection point P2. In the present example, the path 201 is a non-collision path between the inspection point P1 and the inspection point P2 (i.e., the path will not collide with the object to be inspected TOI), and the path 203 is a straight line path between the inspection point P1 and the inspection point P2. In the present example, the straight path (i.e., the path 203) between the inspection point P1 and the inspection point P2 will collide with the object to be inspected TOI.

In the present embodiment, the processor 13 further calculates a risk value corresponding to each of the flight segments.

In some embodiments, the calculation of the risk value may be related to the difference between the path length corresponding to the flight segment and the straight-line path length. Specifically, the risk value corresponding to each of the flight segments is calculated based on a ratio of each path length of the flight segments to a straight line distance (i.e., the greater the difference between the path length corresponding to the flight segment and the straight-line path length, the higher the risk value).

For example, the processor 13 can utilize the following risk factor formula to calculate the risk value corresponding to each of the flight segments:

$$R(P_i, P_j) = \frac{D'_{i,j}}{D_{i,j}} - 1.0$$

In the above formula, the variables $P_i$ and $P_j$ are any two inspection points (i.e., any two inspection points among the inspection points), the variable $D'_{i,j}$ is the non-collision path length of the inspection points $P_i$ and $P_j$, and the variable $D_{i,j}$ is the straight-line path length (i.e., Euclidean distance) of the inspection points $P_i$ and $P_j$.

In some embodiments, the calculation of the risk value may be related to the distance between the path corresponding to the flight segment and the object to be inspected (i.e., the closer the flight path of the unmanned aerial vehicle is to the object to be inspected, the higher the risk value). Specifically, the risk value corresponding to each of the flight segments is calculated based on an integral value of an approach distance between each of the flight segments and the target object to be inspected (i.e., the smaller the accumulated approach distance of the flight segment, the higher the risk value).

Finally, in this embodiment, the processor 13 generates an inspection route corresponding to the target object to be inspected based on the risk values and the flight segments.

In some embodiments, the processor 13 may select a candidate inspection path with a lower risk value from the plurality of candidate inspection paths (i.e., each of the candidate inspection paths is a path consisting of a plurality of flight segments and passing through all inspection points) as the inspection route of the object to be inspected. Specifically, the processor 13 enumerates a plurality of candidate inspection paths, wherein each of the candidate inspection paths passes through all of the inspection points. Next, the processor 13 calculates a path risk value corresponding to each of the candidate inspection paths based on the risk values corresponding to the flight segments. Finally, the processor 13 selects a first candidate inspection path among the candidate inspection paths as the inspection route based on the path risk values.

In some embodiments, the first candidate inspection path corresponds to the lowest path risk value.

In some embodiments, the first candidate inspection path corresponds to the minimum path distance length (i.e., the distance that the unmanned aerial vehicle needs to fly is the shortest). For example, the processor 13 may combine the flight segments based on a shortest path algorithm (e.g., Dijkstra) to generate the first candidate inspection path with the shortest path distance.

For example, the processor 13 can utilize the following formula to calculate the path risk value:

$$R_{all} = \frac{1}{N-1}\sum_{i=1}^{N-1} R(Q_i, Q_{i+1})$$

In the above formula, the variable $Q_i$ is the shortest candidate inspection path including each of the inspection points (i.e., $Q_i$ is the initial inspection point and $Q_N$ is the final inspection point), and the variable N is the number of inspection points.

In some embodiments, in order to exclude paths with higher risk values to reduce the number of paths to be calculated, and to speed up the speed at which the processor 13 selects from a plurality of candidate inspection paths, the processor 13 can first filter the candidate inspection paths through a risk threshold. Specifically, the processor 13 selects the first candidate inspection path after deleting the candidate inspection paths corresponding to the path risk value greater than a risk threshold among the candidate inspection paths, wherein the risk threshold is related to a route angle.

For example, the processor 13 may set the risk threshold to be 30 degrees of the route angle (i.e., avoid route detours exceeding 30 degrees), and when the candidate inspection path has a path with a route angle exceeding 30 degrees (i.e., the path risk value corresponding to the candidate inspection path is greater than a risk threshold), the processor 13 deletes the candidate inspection path.

In some implementations, the processor 13 may further determine whether the inspection route can be performed by a single aerial vehicle or whether the unmanned aerial vehicle quantity needs to be increased based on a flight distance threshold of the single aerial vehicle.

In some embodiments, the flight distance threshold of the single aerial vehicle is calculated based on a flight speed and a maximum flight time of an unmanned aerial vehicle.

For example, when the flight speed of an unmanned aerial vehicle is 20 km/h and the maximum flight time is 30 minutes, the flight distance threshold of the single aerial vehicle should be set below 10 kilometers (i.e., when the flight of the unmanned aerial vehicle exceeds the flight distance threshold of the single aerial vehicle, there is a possibility of danger).

Therefore, when the processor 13 determines that the path distance of the inspection route is greater than the flight distance threshold of the single aerial vehicle, it means that the inspection route cannot be executed by a single unmanned aerial vehicle, and the processor 13 divides the inspection route into multiple inspection sub-routes (i.e., with multiple-source paths)).

It shall be appreciated that the present disclosure does not limit the generation of multiple inspection sub-routes. The take-off position and end position of each inspection sub-route do not need to correspond to the same spatial position, and each of the unmanned aerial vehicles can perform inspection tasks based on the corresponding inspection sub-routes.

For example, the processor 13 may start with the unmanned aerial vehicle quantity being 2, and check whether the inspection sub-route path distance performed by each of the unmanned aerial vehicles is greater than the flight distance threshold of the single aerial vehicle. When the inspection sub-route path distance performed by each of the unmanned aerial vehicles is still greater than the flight distance threshold of the single aerial vehicle, the processor 13 continues to increase the unmanned aerial vehicle quantity, and so on, until the processor 13 determines that the inspection sub-route path distance performed by each of the unmanned aerial vehicles has met the flight distance threshold of the single aerial vehicle.

In some embodiments, the inspection route further corresponds to an unmanned aerial vehicle quantity and at least one inspection sub-route corresponding to the unmanned aerial vehicle quantity, and each of the at least one inspection sub-route passes through at least one of the inspection points.

In some embodiments, the processor 13 may adjust the unmanned aerial vehicle quantity participating in the inspection route based on the basic device capabilities of the unmanned aerial vehicle. For example, when a single unmanned aerial vehicle cannot complete the inspection route, increase the unmanned aerial vehicle quantity participating in the inspection route.

Specifically, the processor 13 adjusts the unmanned aerial vehicle quantity of the first candidate inspection path based on a flight distance threshold of a single aerial vehicle. Next, the processor 13 generates the at least one inspection sub-route based on the unmanned aerial vehicle quantity.

According to the above descriptions, the unmanned aerial vehicle inspection route generating apparatus 1 provided by the present disclosure calculates a plurality of flight segments and corresponding risk values by a three-dimensional model corresponding to a target object to be inspected and a plurality of spatial coordinates corresponding to a plurality of inspection points. Next, the unmanned aerial vehicle inspection route generating apparatus 1 provided by the present disclosure generates an inspection route corresponding to the target object to be inspected based on the risk values and the flight segments. In addition, the unmanned aerial vehicle inspection route generating apparatus 1 provided by the present disclosure can further adjust the unmanned aerial vehicle quantity of the inspection path based on a flight distance threshold of a single aerial vehicle, and generate the at least one inspection sub-route based on the unmanned aerial vehicle quantity. Since the unmanned aerial vehicle inspection route generating apparatus 1 can automatically generate the inspection route corresponding to the target to be inspected, it solves the various shortcomings of the prior art that requires manual planning.

A second embodiment of the present disclosure is an unmanned aerial vehicle inspection route generating method and a flowchart thereof is depicted in FIG. 3. The unmanned aerial vehicle inspection route generating method 300 is adapted for an electronic apparatus (e.g., the unmanned aerial vehicle inspection route generating apparatus 1 of the first embodiment). The unmanned aerial vehicle inspection route generating method 300 generates an inspection route corresponding to the target object to be inspected through steps S301 to S305.

In the step S301, the electronic apparatus calculates a plurality of flight segments based on a three-dimensional model corresponding to a target object to be inspected and a plurality of spatial coordinates corresponding to a plurality of inspection points, wherein the inspection points correspond to the target object to be inspected, and each of the flight segments corresponds to two of the inspection points.

Next, in the step S303, the electronic apparatus calculates a risk value corresponding to each of the flight segments.

Finally, in the step S305, the electronic apparatus generates an inspection route corresponding to the target object to be inspected based on the risk values and the flight segments.

In some embodiments, wherein the step of calculating the flight segments comprises the following steps: performing the following steps for any of a first inspection point and a second inspection point among the inspection points: calculating at least one non-collision path between the first inspection point and the second inspection point based on a plurality of nodes contained in the three-dimensional model, the spatial coordinate corresponding to the first inspection point, and the spatial coordinate corresponding to the second inspection point, wherein each of the at least one non-collision path does not collide with the nodes of the three-dimensional model; and selecting a shortest path from the at least one non-collision path as the flight segment corresponding to the first inspection point and the second inspection point.

In some embodiments, the risk value corresponding to each of the flight segments is calculated based on a ratio of each path length of the flight segments to a straight line distance.

In some embodiments, the step of generating the inspection route corresponding to the target object to be inspected comprises the following steps: enumerating a plurality of candidate inspection paths, wherein each of the candidate inspection paths passes through all of the inspection points; calculating a path risk value corresponding to each of the candidate inspection paths based on the risk values corresponding to the flight segments; and selecting a first candidate inspection path among the candidate inspection paths as the inspection route based on the path risk values.

In some embodiments, the first candidate inspection path corresponds to the lowest path risk value.

In some embodiments, the unmanned aerial vehicle inspection route generating method 300 further comprises the following steps: selecting the first candidate inspection path after deleting the candidate inspection paths corresponding to the path risk value greater than a risk threshold among the candidate inspection paths, wherein the risk threshold is related to a route angle.

In some embodiments, the inspection route further corresponds to an unmanned aerial vehicle quantity and at least one inspection sub-route corresponding to the unmanned aerial vehicle quantity, and each of the at least one inspection sub-route passes through at least one of the inspection points.

In some embodiments, the unmanned aerial vehicle inspection route generating method 300 further comprises the following steps: adjusting the unmanned aerial vehicle quantity of the first candidate inspection path based on a flight distance threshold of a single aerial vehicle; and generating the at least one inspection sub-route based on the unmanned aerial vehicle quantity.

In some embodiments, the flight distance threshold of the single aerial vehicle is calculated based on a flight speed and a maximum flight time of an unmanned aerial vehicle.

In some embodiments, the risk value corresponding to each of the flight segments is calculated based on an integral value of an approach distance between each of the flight segments and the target object to be inspected.

In addition to the aforesaid steps, the second embodiment can also execute all the operations and steps of the unmanned aerial vehicle inspection route generating apparatus 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

It shall be appreciated that in the specification and the claims of the present disclosure, some words (e.g., the candidate inspection path, the inspection point, etc.) are preceded by terms such as "first" or "second", and these terms of "first" or "second" are only used to distinguish these different words. For example, the "first" and "second" in the first inspection point and the second inspection point are only used to indicate the inspection point used in different operations.

According to the above descriptions, the unmanned aerial vehicle inspection route generating technology (at least including the apparatus and the method) provided by the present disclosure calculates a plurality of flight segments and corresponding risk values by a three-dimensional model corresponding to a target object to be inspected and a plurality of spatial coordinates corresponding to a plurality of inspection points. Next, the unmanned aerial vehicle inspection route generating technology provided by the present disclosure generates an inspection route corresponding to the target object to be inspected based on the risk values and the flight segments. In addition, the unmanned aerial vehicle inspection route generating technology provided by the present disclosure can further adjust the unmanned aerial vehicle quantity of the inspection path based on a flight distance threshold of a single aerial vehicle, and generate the at least one inspection sub-route based on the unmanned aerial vehicle quantity. Since the unmanned aerial vehicle inspection route generating technology can automatically generate the inspection route corresponding to the target to be inspected, it solves the various shortcomings of the prior art that requires manual planning.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An unmanned aerial vehicle inspection route generating apparatus, comprising:
   a storage, being configured to store a three-dimensional model corresponding to a target object to be inspected; and
   a processor, being electrically connected to the storage, and being configured to perform operations comprising:
      generating a plurality of inspection points corresponding to the target object to be inspected, wherein each of the inspection points corresponds to a spatial coordinate;
      calculating a plurality of flight segments based on the three-dimensional model and the spatial coordinates corresponding to the inspection points, wherein each of the flight segments corresponds to two of the inspection points;
      calculating a risk value corresponding to each of the flight segments, wherein the risk value corresponding to each of the flight segments is calculated based on a ratio of each path length of the flight segments to a straight line distance; and
      generating an inspection route corresponding to the target object to be inspected based on the risk values and the flight segments.

2. The unmanned aerial vehicle inspection route generating apparatus of claim 1, wherein the operation of calculating the flight segments comprises the following operations:
   performing the following operations for any of a first inspection point and a second inspection point among the inspection points:
      calculating at least one non-collision path between the first inspection point and the second inspection point based on a plurality of nodes contained in the three-dimensional model, the spatial coordinate corresponding to the first inspection point, and the spatial coordinate corresponding to the second inspection point, wherein each of the at least one non-collision path does not collide with the nodes of the three-dimensional model; and
      selecting a shortest path from the at least one non-collision path as the flight segment corresponding to the first inspection point and the second inspection point.

3. The unmanned aerial vehicle inspection route generating apparatus of claim 1, wherein the operation of generating the inspection route corresponding to the target object to be inspected comprises the following operations:
   enumerating a plurality of candidate inspection paths, wherein each of the candidate inspection paths passes through all of the inspection points;
   calculating a path risk value corresponding to each of the candidate inspection paths based on the risk values corresponding to the flight segments; and
   selecting a first candidate inspection path among the candidate inspection paths as the inspection route based on the path risk values.

4. The unmanned aerial vehicle inspection route generating apparatus of claim 3, wherein the first candidate inspection path corresponds to the lowest path risk value.

5. The unmanned aerial vehicle inspection route generating apparatus of claim 3, wherein the processor is further configured to perform the following operations:
   selecting the first candidate inspection path after deleting the candidate inspection paths corresponding to the path risk value greater than a risk threshold among the candidate inspection paths, wherein the risk threshold is related to a route angle.

6. The unmanned aerial vehicle inspection route generating apparatus of claim 3, wherein the inspection route further corresponds to an unmanned aerial vehicle quantity and at least one inspection sub-route corresponding to the unmanned aerial vehicle quantity, and each of the at least one inspection sub-route passes through at least one of the inspection points.

7. The unmanned aerial vehicle inspection route generating apparatus of claim 6, wherein the processor is further configured to perform the following operations:
   adjusting the unmanned aerial vehicle quantity of the first candidate inspection path based on a flight distance threshold of a single aerial vehicle; and
   generating the at least one inspection sub-route based on the unmanned aerial vehicle quantity.

8. The unmanned aerial vehicle inspection route generating apparatus of claim 7, wherein the flight distance threshold of the single aerial vehicle is calculated based on a flight speed and a maximum flight time of an unmanned aerial vehicle.

9. An unmanned aerial vehicle inspection route generating method, being adapted for use in an electronic apparatus, wherein the unmanned aerial vehicle inspection route generating method comprises the following steps:
   calculating a plurality of flight segments based on a three-dimensional model corresponding to a target object to be inspected and a plurality of spatial coordinates corresponding to a plurality of inspection points, wherein the inspection points correspond to the target object to be inspected, and each of the flight segments corresponds to two of the inspection points;
   calculating a risk value corresponding to each of the flight segments, wherein the risk value corresponding to each of the flight segments is calculated based on a ratio of each path length of the flight segments to a straight line distance; and generating an inspection route corresponding to the target object to be inspected based on the risk values and the flight segments.

10. The unmanned aerial vehicle inspection route generating method of claim 9, wherein the step of calculating the flight segments comprises the following steps:

performing the following steps for any of a first inspection point and a second inspection point among the inspection points:

calculating at least one non-collision path between the first inspection point and the second inspection point based on a plurality of nodes contained in the three-dimensional model, the spatial coordinate corresponding to the first inspection point, and the spatial coordinate corresponding to the second inspection point, wherein each of the at least one non-collision path does not collide with the nodes of the three-dimensional model; and selecting a shortest path from the at least one non-collision path as the flight segment corresponding to the first inspection point and the second inspection point.

11. The unmanned aerial vehicle inspection route generating method of claim 9, wherein the step of generating the inspection route corresponding to the target object to be inspected comprises the following steps:

enumerating a plurality of candidate inspection paths, wherein each of the candidate inspection paths passes through all of the inspection points;

calculating a path risk value corresponding to each of the candidate inspection paths based on the risk values corresponding to the flight segments; and selecting a first candidate inspection path among the candidate inspection paths as the inspection route based on the path risk values.

12. The unmanned aerial vehicle inspection route generating method of claim 11, wherein the first candidate inspection path corresponds to the lowest path risk value.

13. The unmanned aerial vehicle inspection route generating method of claim 11, wherein the unmanned aerial vehicle inspection route generating method further comprises the following steps:

selecting the first candidate inspection path after deleting the candidate inspection paths corresponding to the path risk value greater than a risk threshold among the candidate inspection paths, wherein the risk threshold is related to a route angle.

14. The unmanned aerial vehicle inspection route generating method of claim 11, wherein the inspection route further corresponds to an unmanned aerial vehicle quantity and at least one inspection sub-route corresponding to the unmanned aerial vehicle quantity, and each of the at least one inspection sub-route passes through at least one of the inspection points.

15. The unmanned aerial vehicle inspection route generating method of claim 14, wherein the unmanned aerial vehicle inspection route generating method further comprises the following steps:

adjusting the unmanned aerial vehicle quantity of the first candidate inspection path based on a flight distance threshold of a single aerial vehicle; and generating the at least one inspection sub-route based on the unmanned aerial vehicle quantity.

16. The unmanned aerial vehicle inspection route generating method of claim 15, wherein the flight distance threshold of the single aerial vehicle is calculated based on a flight speed and a maximum flight time of an unmanned aerial vehicle.

* * * * *